I. CRUM.
AIR BRAKE FOR MOTOR CARS.
APPLICATION FILED JULY 21, 1914.
1,141,939.
Patented June 8, 1915.
2 SHEETS—SHEET 2.
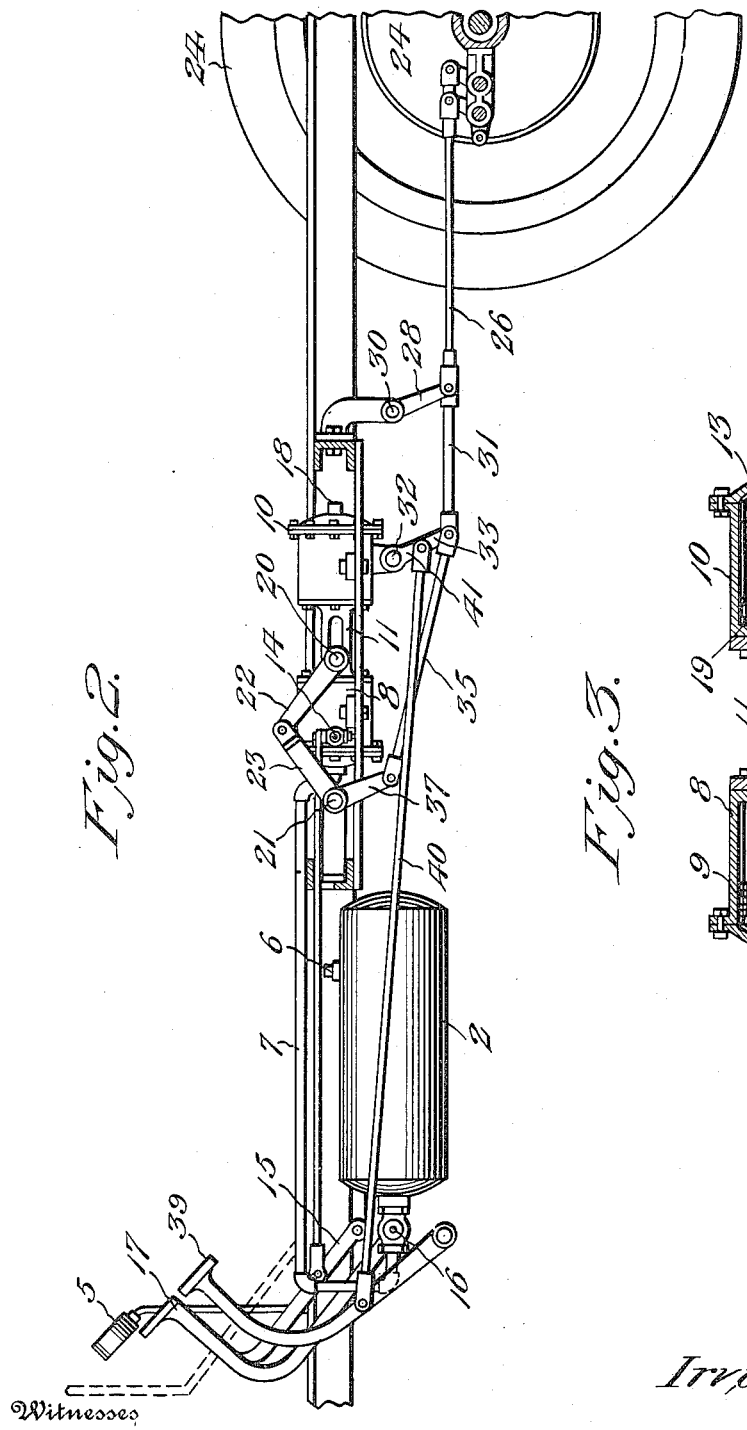
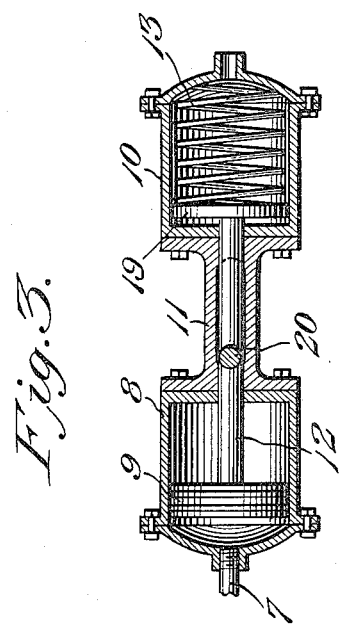
Witnesses
Edwin G. McKee.
R. M. Smith
Inventor
Irvin Crum
By Victor J. Evans
Attorney

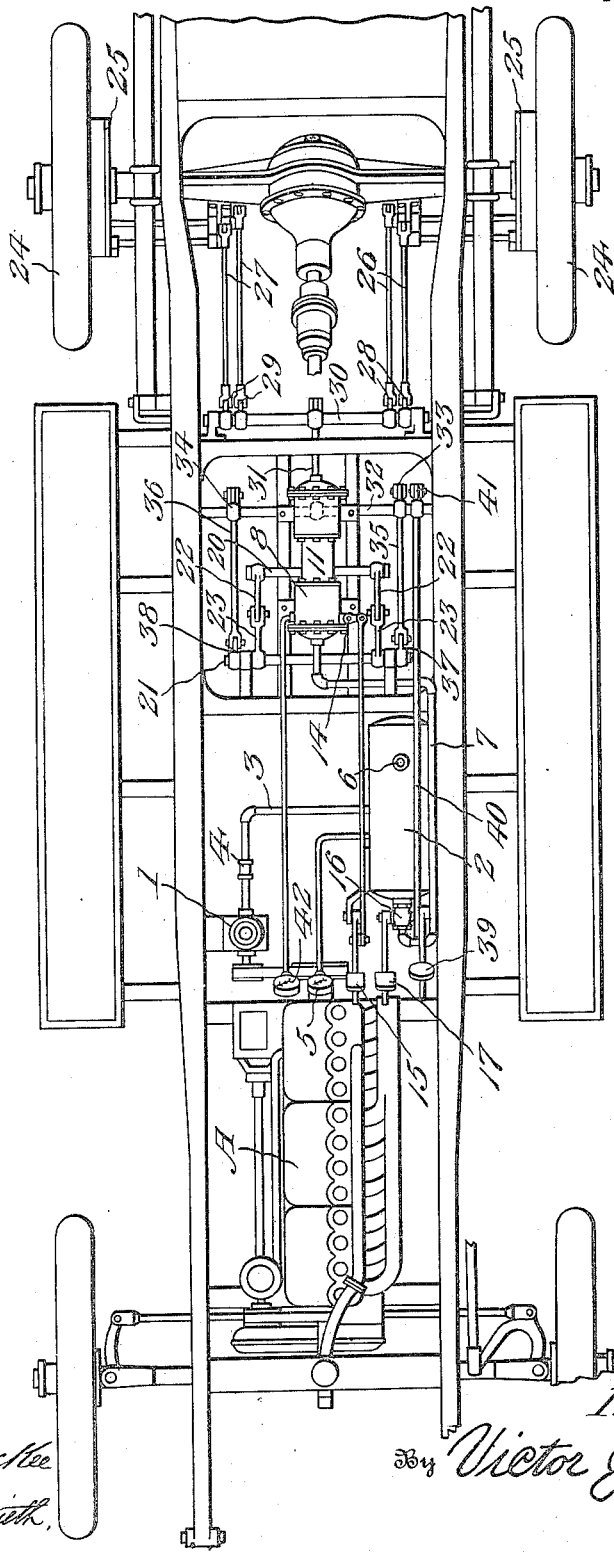

UNITED STATES PATENT OFFICE.

IRVIN CRUM, OF SELMA, ALABAMA.

AIR-BRAKE FOR MOTOR-CARS.

1,141,939. Specification of Letters Patent. Patented June 8, 1915.

Application filed July 21, 1914. Serial No. 852,216.

*To all whom it may concern:*

Be it known that I, IRVIN CRUM, a citizen of the United States, residing at Selma, in the county of Dallas and State of Alabama, have invented new and useful Improvement in Air-Brakes for Motor-Cars, of which the following is a specification.

This invention relates to air brakes for motorcars or vehicles, the object of the invention being to provide simple, practical and reliable apparatus adapted to be used in connection with any present day automobile or other motor vehicle, whereby the operator, by a simple pressure on a pedal is enabled to effect the application of the brake or brakes by means of compressed air, the air being automatically stored in a reservoir or tank by and during the operation of the engine of the motorcar.

With the above and other objects in view, the invention consists in the novel construction, combination and arrangement of parts, as herein described, illustrated and claimed.

In the accompanying drawings:—Figure 1 is a bottom plan view of the frame of a motorcar, showing a sufficient portion of the mechanism thereof to identify and illustrate the construction and relation of the present invention thereto. Fig. 2 is a vertical longitudinal section through the same. Fig. 3 is an enlarged detail longitudinal section through the air brake, cylinder and parts intimately associated therewith.

Referring to the drawings 1 designates an air compressor or pump which is geared to and driven directly by the engine of a motorcar, such engine being conventionally shown at A.

2 designates a storage tank or reservoir which is connected with the pump to receive the air therefrom by means of a pipe 3 equipped with a back pressure check valve 4. The tank has associated therewith a pressure gage 5 and a safety valve 6 and said tank or reservoir 2 is connected by means of a pipe 7 with the receiving end of an air brake cylinder 8 in which is a reciprocatory piston 9.

In axial alinement with the cylinder 8 is a spring containing cylinder 10, the cylinders 8 and 10 being connected in fixed relative positions by means of a slotted yoke 11. The piston rod 12 extends from the piston 9 through the yoke 11 into the cylinder 10 where it is acted upon by a piston returning spring 13 which, as soon as a relief valve 14 is operated in the cylinder 8, returns the piston 9 to its position of rest. The relief valve 14 is shown as operated by means of a pedal 15.

16 designates a valve for admitting pressure from the tank 2 to the cylinder 8, said valve being shown as controlled by the pedal 17.

18 designates an air vent in the cylinder 10 to allow for the movement of the plunger 19 carried by the end of the piston rod.

Connected to and carried by the piston rod 12 is a cross arm 20 and parallel to said cross arm is a rock shaft 21, the cross arm and rock shaft being connected at opposite sides of and equidistantly from the piston rod by means of toggle arms 22 and 23. Under the arrangement shown and described, as the cross arm 20 is moved by the piston rod, the arms 22 and 23 serve to rock the shaft 21 and operate the connections which apply and release the brake or brakes.

In the usual arrangement of brakes on a motorcar, external contracting and internal expanding brake bands or shoes are used in connection with each of the rear driving wheels 24, said bands or shoes coöperating with the drums 25 carried by said wheels. In order to provide connections which will operate these brake bands, I provide two sets of connections 26 and 27 as shown in Fig. 1, said connections being operated by corresponding sets of arms 28 and 29 on a countershaft 30 mounted to oscillate in bearings on the machine frame. The shaft 30 is operatively connected by means 31 to a relatively shorter rock shaft 32 connected by arms 33 and 34 and rods 35 and 36 to arms 37 and 38 on the shaft 21 hereinabove described. The ordinary foot brake lever 39 is connected by a rod 40 to another arm 41 on the shaft 32 to provide manual application of the brakes as well as the pneumatic application. An air pressure gage 42 may also be provided upon the cylinder 8 so that the operator may observe the amount of air pressure therein at any time.

From the foregoing description, taken in connection with the accompanying drawings it will now be understood that the operator by pressing on the pedal 17 admits air from the storage tank or reservoir 2 to the brake cylinder 8, resulting in the application of the brake or brakes. To release the brakes, he presses on the other pedal 15 and opens the relief valve 14 allowing the spring in the cylinder 10 to return the piston to its initial position of rest. Should there be insufficient pressure of air in the tank 2, the brakes may be applied in the usual way by means of the lever 39.

The brake mechanism hereinabove described may be applied to new machines as they are built at the factory or to machines already in use.

What I claim is:—

Air brake apparatus for motor cars, comprising an air pump, a compressed air storage tank, a brake cylinder in communication with said tank, a spring-containing cylinder in axial alinement with the brake cylinder, a slotted yoke connecting said cylinders in fixed relative positions, a piston in the brake cylinder, a piston rod extending therefrom into the spring-containing cylinder, a spring in the last named cylinder which acts on the piston rod to return the piston to its position of rest, a cross arm carried by said piston rod and working in the slotted yoke, a rock shaft, toggle arms connecting said rock shaft with said cross arm, a brake shoe, and operating connections between said rock shaft and brake shoe.

In testimony whereof I affix my signature in presence of two witnesses.

IRVIN CRUM.

Witnesses:
CHAS. I. MOTTE,
JEROME LEVA.

Copies of this patent may be obtained for five cents each, by addressing the "Commissioner of Patents, Washington, D. C."